United States Patent [19]

Ehnot et al.

[11] Patent Number: 5,993,531
[45] Date of Patent: Nov. 30, 1999

[54] LOW TEMPERATURE CONCRETE HARDENER

[75] Inventors: Nicholas P. Ehnot, Kirkland; Walter Vizcaino, Littleton, both of Wash.

[73] Assignee: Chemtron Polymers, Kirkland, Wash.

[21] Appl. No.: 09/173,255

[22] Filed: Oct. 14, 1998

[51] Int. Cl.⁶ .................................................. C09O 191/00
[52] U.S. Cl. .......................................... 106/263; 106/252
[58] Field of Search ...................................... 106/252, 263

[56] References Cited

U.S. PATENT DOCUMENTS

Re. 34,944    5/1995   Yamane .................................... 428/335

OTHER PUBLICATIONS

CA 125:89445, Elmaeng, "Solvent systems for replacing ...", Mar. 1996.

*Primary Examiner*—David Brunsman
*Attorney, Agent, or Firm*—Weiss Jensen Ellis & Howard

[57] ABSTRACT

A concrete hardening and dust prevention solution that can be applied at low temperatures to harden and air-dry concrete surfaces. The low temperature concrete hardening and dust prevention solution comprises about 75% by weight of dimethyl glutarate, about 24.75% by weight of tung oil, and about 0.25% by weight of dimethyl phtalate. The low temperature concrete hardening and dust prevention solution may be applied at temperatures ranging from −35 degrees Fahrenheit to +42 degrees Fahrenheit.

2 Claims, No Drawings

LOW TEMPERATURE CONCRETE HARDENER

TECHNICAL FIELD

The present invention relates to surface treatment compounds that are applied to concrete surfaces to promote stabilization and hardening of the surfaces and, in particular, to a concentrated polymerizing solution for application, at low temperatures, to concrete surfaces in order to promote hardening and to prevent concrete dust formation.

BACKGROUND OF THE INVENTION

Concrete surfaces are commonly used for the floors of industrial and commercial cold rooms, including chillers, coolers and freezers. Concrete is suitable for such applications because concrete has relatively low thermal expansion, concrete is resistance to compression and can support heavy loads, concrete can be easily shaped and formed at a construction site, hardened concrete is relatively inert towards solvents, acids and caustic chemicals, and concrete is relatively inexpensive. However, untreated concrete surfaces are not resistant to abrasion from mechanical insults, such as the pulling of heavy objects across concrete surfaces or the impact of falling objects onto concrete surfaces. Also, untreated concrete surfaces are prone to producing a fine, abrasive dust that can degrade the quality of air within a cold room and that can cause significant mechanical damage to mechanical systems such as air compressors and refrigeration units. It is therefore desirable to treat concrete floors in cold rooms with chemical agents to render the surface of the concrete more resistant to abrasion and to control the formation and buildup of concrete dust that results from abrasion.

Commonly used chemical agents for treating concrete surfaces include silicofluorides along with sodium silicate, aluminum, or zinc sulfate, or drying oils like linseed oil or tung oil. Alternatively, silicon carbide, fused alumina, or finely divided iron/ammonium chloride preparations may be incorporated into liquid concrete in order to produce a harder surface in the final, hardened and air dried concrete product. Although silicon carbide, fused alumina, and finely divided iron-ammonium chloride preparations render a concrete surface more resistant to abrasion, they are not very effective in rendering a surface less dusty. Silicofluoride or drying oil treatments both harden concrete surfaces and render the surfaces less dusty, but may produce less than desirable results when applied at low temperatures. A need has therefore been recognized for a liquid preparation for treating concrete floors at low temperatures in order to harden the concrete floor surfaces and to prevent the formation and buildup of concrete dust.

SUMMARY OF THE INVENTION

A preferred embodiment of the present invention is a liquid concrete hardening and dust prevention treatment composed of a dibasic ester, tung oil, and dimethyl phtalate. The dibasic ester, in the preferred embodiment, is dimethyl glutarate acid, and comprises about 75% by weight of the low temperature concrete hardening and dust prevention solution. The tung oil comprises about 24.75% by weight of the low temperature concrete hardening and dust prevention solution. The dimethyl phtalate comprises about 0.25% by weight of the low temperature concrete hardening and dust prevention solution. The low temperature concrete hardening and dust prevention solution is applied to a concrete surface by spray application at temperatures ranging from −35 to +42 degrees Fahrenheit.

DETAILED DESCRIPTION OF THE INVENTION

The present invention is a concrete hardening and dust prevention solution that can be applied to a hardened and air-dried concrete surface at the relatively low temperatures encountered in industrial and commercial cold rooms. A preferred embodiment of the present invention is prepared by mixing together the following three chemical components:

(a) about 75% by weight of dimethyl glutarate (1,5-pentanedioic acid dimethyl ester), having the formula:

$CH_3OOC(CH_2)_3COOCH_3$ (b) about 24.75% by weight of tung oil, a drying oil obtained from seeds of *Aleurites cordata*, the chief fatty acid component of which is eleostearic acid; and (c) about 0.25% by weight of dimethyl phtalate (1,2-benzene dicarboxylic acid dimethyl ester), having the formula:

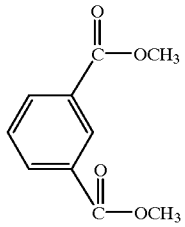

Dibasic esters, such as dimethyl glutarate, have the general chemical formula:

$CH_3OOC(CH_2)_nCOOCH_3$

Besides dimethyl glutarate, dibasic esters of the above formula with n=2, 4, 5, and 6 (dimethyl succinate, dimethyl adipate, dimethyl pimelate, and dimethyl suberate, respectively), or combinations of the above dibasic esters, may be used to produce a low temperature concrete hardening and dust prevention solution. A variety of other plasticizing and odor masking agents, other than dimethyl phtalate, may be employed.

The low temperature concrete hardening and dust prevention solution of the preferred embodiment is ready to use directly from the container, and has a shelf life of approximately one-year. The concrete surface to be treated must be structurally sound, must have no residual curing compounds, sealers, waxes, or other coatings, and must be sanded and vacuumed dust free. The low temperature concrete hardening and dust prevention solution is optimally applied by spraying at a coverage rate of 80 square feet per gallon and then back rolling with a short nap paint type roller. For extremely porous concrete surfaces, a second application of the low temperature concrete hardening and dust prevention solution may be necessary. The low temperature concrete hardening and dust prevention solution may be applied within a temperature range of from −35 degrees to +42 degrees Fahrenheit. At +42 degrees Fahrenheit, the low temperature concrete hardening and dust prevention solution polymerizes to a tack free surface after 30 minutes. At −35 degrees Fahrenheit, tack free polymerization time is 90 minutes. Excess solution can be buffed or wiped up with towels.

Although the present invention has been described in terms of preferred embodiments, it is not intended that the invention be limited to these embodiments. Modifications within the spirit of the invention will be apparent to those skilled in the art. For example, as noted above, dibasic esters other than dimethyl glutarate may be used in preparing the low temperature concrete hardening and dust prevention solution. Various types of plasticizing and odor masking agents, other than dimethyl pltalate, may be employed. Other types of drying oils, such as linseed oil, may be used in place of tung oil. The by weight percentage proportions of the drying oil, dibasic ester, and plasticizing and odor masking components may be varied to provide slightly altered properties for the low temperature concrete hardening and dust prevention solution. Application techniques may differ. For example, coverage rates less than or greater than 80 square feet per gallon may be employed, and non-spray application techniques may be employed to apply the low temperature concrete hardening and dust prevention solution to a hardened concrete surface.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

I claim:

1. A concrete hardening and dust prevention solution comprising:

about 70% to 80% by weight of at least one dibasic ester selected from the group of dibasic ester compounds having the formula:

$$CH_3OOC(CH_2)_nCOOCH_3$$

wherein n ranges from 2 to 6;

about 20% to 30% by weight of a drying oil selected from the group of drying oils including tung oil and linseed oil; and about 0.1% to 5% by weight of a plasticizing and odor masking agent.

2. The concrete hardening and dust prevention solution of claim 1 comprising:

75% by weight of dimethyl glutarate;

24.75% by weight of tung oil; and 0.25% by weight of dimethyl phtalate.

* * * * *